US006758738B1

(12) United States Patent
Keller

(10) Patent No.: US 6,758,738 B1
(45) Date of Patent: Jul. 6, 2004

(54) DAMPER WITH INTEGRAL SEAL

(75) Inventor: Frederick P. Keller, Alto, MI (US)

(73) Assignee: Noble Polymers, LLC, Grand Rapids, MI (US)

( * ) Notice: Subject to any disclaimer, the term of this patent is extended or adjusted under 35 U.S.C. 154(b) by 0 days.

(21) Appl. No.: 10/089,527
(22) PCT Filed: Sep. 29, 2000
(86) PCT No.: PCT/US00/27021
§ 371 (c)(1), (2), (4) Date: Mar. 27, 2002
(87) PCT Pub. No.: WO01/23199
PCT Pub. Date: Apr. 5, 2001

Related U.S. Application Data
(60) Provisional application No. 60/157,199, filed on Sep. 30, 1999.

(51) Int. Cl.$^7$ ................................................ B24D 13/00
(52) U.S. Cl. ......................... 454/69; 454/275; 428/71
(58) Field of Search .............................. 428/71; 454/69, 454/264, 255, 259, 275

(56) References Cited

U.S. PATENT DOCUMENTS

| 4,286,001 A | 8/1981 | Frau |
| 4,677,021 A | 6/1987 | Kayakabe et al. |
| 5,212,208 A | 5/1993 | Soderberg |
| 5,690,881 A | * 11/1997 | Horie et al. ................. 264/263 |
| 6,093,358 A | * 7/2000 | Schiewe et al. ............ 264/250 |

* cited by examiner

Primary Examiner—Derek Boles
(74) Attorney, Agent, or Firm—McGarry Bair, PC

(57) ABSTRACT

A damper for an air passageway comprises a rigid carrier plate having opposed faces defined by a periphery with a shape generally corresponding to but smaller than the shape of a cross-section of the air passageway and formed of a material having a melting point above an activation temperature range; a heat-expandable sealing material mounted to at least one of the opposed faces of the rigid carrier plate and which is adapted to expand at a temperature in the activation temperature range; the sealing material, when activated, is adapted to expand radially from the rigid carrier plate to form an integral seal with the carrier plate. The heat-expandable sealing material can be integrally molded to the outer periphery of the carrier plate. A process for making the damper with integral seal is also disclosed.

18 Claims, 2 Drawing Sheets

DAMPER WITH INTEGRAL SEAL

PRIORITY CLAIM

This application claims priority on International Application No. PCT/US00/27021, filed Sep. 29, 2000, which claims priority on U.S. Provisional Application No. 60/157,199, filed Sep. 30, 1999.

BACKGROUND OF THE INVENTION

1. Field of the Invention

This invention relates to a damper door for a heating and cooling system for a vehicle and, more particularly, to a damper door with an integral seal. The invention also relates to a method for manufacturing the damper door with an integral seal.

2. Related Art

Vehicle heating and cooling systems have an air conduit with multiple outlets for discharging flow to the air into a cabin of the vehicle, dampers for selectively opening or closing the outlets, and a drive device for each damper. These dampers may include a carrier plate having a foam seal formed on one or both faces of the carrier plate, preferably near the periphery of the faces, or about the peripheral edge of the carrier plate. The seal, when the damper is rotated to a closed position, blocks air from passing about the periphery of the damper. The sealing material is adhered to the carrier plate by a conventional adhesive applied between the carrier plate and the sealing material. This method of assembly is time and labor intensive. Even if the process is automated, application of the adhesive to the carrier plate and aligning the sealing material with the carrier plate are additional steps in the assembly process.

A conventional heating and cooling system includes an air conduit connecting a blower, an evaporator, and a heater core. The blower generates an air flow directed to the cabin of the vehicle. The evaporator is in a refrigeration cycle whereby a heat exchange of the air flow with a cooling medium inside the evaporator cools the air flow. The heater core has an inner passageway connected to a cooling water passageway of an internal combustion engine so that hot engine cooling water from the passageway is introduced into the inner passageway of the heater core, whereby a heat exchange of the air flow of the engine cooling water warms the air flow to obtain a desired temperature of the air. A hot air passageway includes a damper positioned upstream of the heater core for controlling the ratio of air passing through the heater core to the amount of air bypassing the heater core, whereby a desired temperature of the air directed to the cabin is obtained. Similarly, a cool air passageway is opened or closed by a damper for introducing cooled air from the evaporator to various outlets or vents in the passenger cabin according to the operator's temperature selection The degree of opening of the dampers in the air passageways to the evaporator or heater core controls the temperature in the passenger cabin.

SUMMARY OF THE INVENTION

According to the invention, a damper for selectively opening or closing an air passageway in a vehicle heating and cooling system includes a rigid carrier plate having opposed faces defined by a periphery with a shape generally corresponding to but smaller than the shape of a cross-section of the air passageway and formed of a material having a melting point above an activation temperature range. A heat-expandable sealing material, which is adapted to expand at a temperature in the activation temperature range, is mounted to at least one of the opposed faces of the rigid carrier plate. The sealing material, when activated, expands radially from the rigid carrier plate to form an integral seal with the carrier plate.

Further according to the invention, a damper for selectively opening or closing an air passageway in a vehicle heating and cooling system includes a rigid carrier plate having opposed faces defined by a periphery with a shape generally corresponding to but smaller than the shape of a cross-section of the air passageway and formed of a material having a melting point above an activation temperature range. A heat-expanded foam sealing material, which has been expanded at a temperature in the activation temperature range, is mounted to at least one of the opposed faces of the rigid carrier plate. The sealing material forms an integral seal with the carrier plate.

In one embodiment of the invention, the sealing material is integrally molded to at least one of the opposed faces of the rigid carrier plate. In another embodiment, the opposed faces include a peripheral edge and the seal is formed about the peripheral edge. In a further embodiment of the invention, the heat-expandable sealing material is integrally molded to the outer periphery of the rigid carrier plate.

A process for forming a damper with an integral seal according to the invention includes forming a rigid carrier plate with a material that has a melting point above an activation temperature range and having an outer periphery with a shape generally corresponding to but smaller than the shape of a cross-section of the air passageway; integrally molding a heat-expandable sealing material to the outer periphery of the carrier plate, the heat-expandable sealing material being adapted to expand in the activation temperature range; heating the sealing material into the activation temperature range; and expanding the sealing material radially from the carrier plate to fill a peripheral space between the sealing material and walls of a mold restricting expansion of the sealing material.

In one embodiment of the invention, the forming step includes injection molding. In another embodiment, the integrally molding step comprises injection molding. A further embodiment includes sequentially molding the carrier plate and the sealing material in a two-step molding operation.

Other objects, features, and advantages of the invention will be apparent from the ensuing description in conjunction with the accompanying drawings.

DETAILED DESCRIPTION

Figure 1:
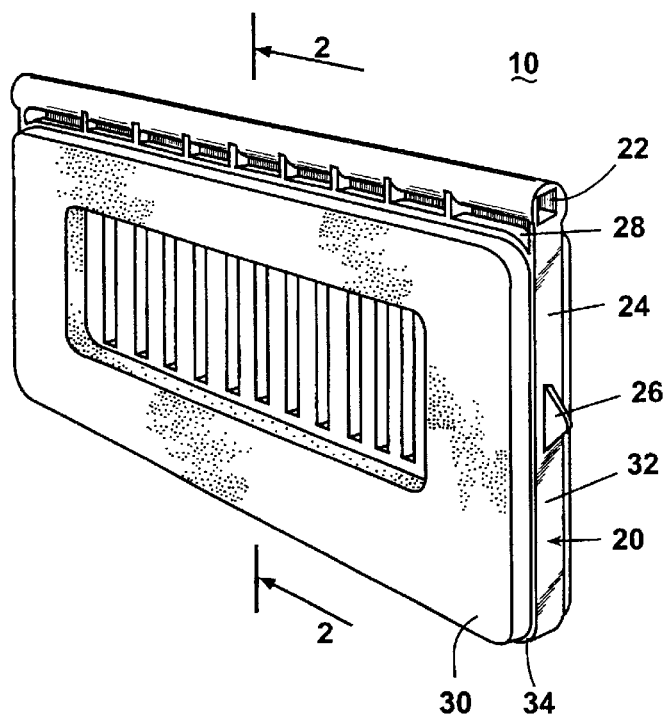
FIG. 1 is a perspective view of a damper door according to the invention.

As shown in FIG. 1, a damper 10 for selectively opening or closing an air passageway of a vehicle's heating and cooling system includes a carrier plate 20 having an integrally formed seal 30 formed of a heat-expanded sealing material. The carrier plate 20 includes a top portion having an axial bore 22 formed therethrough for journaling axle shafts (not shown) received at each end, whereby the damper 10 can be rotated about a longitudinal axis defined by the bore 22. Typically, rotation will be accomplished by a drive device (not shown). Further, lateral side edges 24 of the carrier plate 20 include stop tabs 26 that register with a block (not shown) formed in walls defining the passageway for preventing over-rotation of the damper 10 within the passageway.

Figure 2:
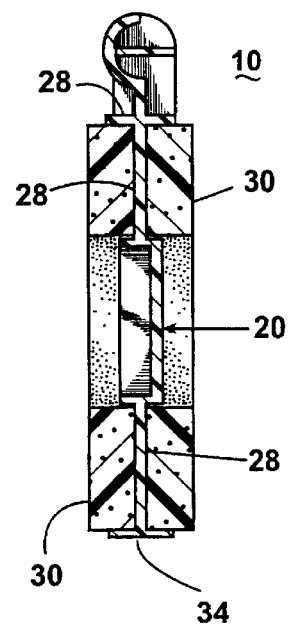
FIG. 2 is a sectional view taken along line 2—2 of the FIG. 1.
Figure 3:
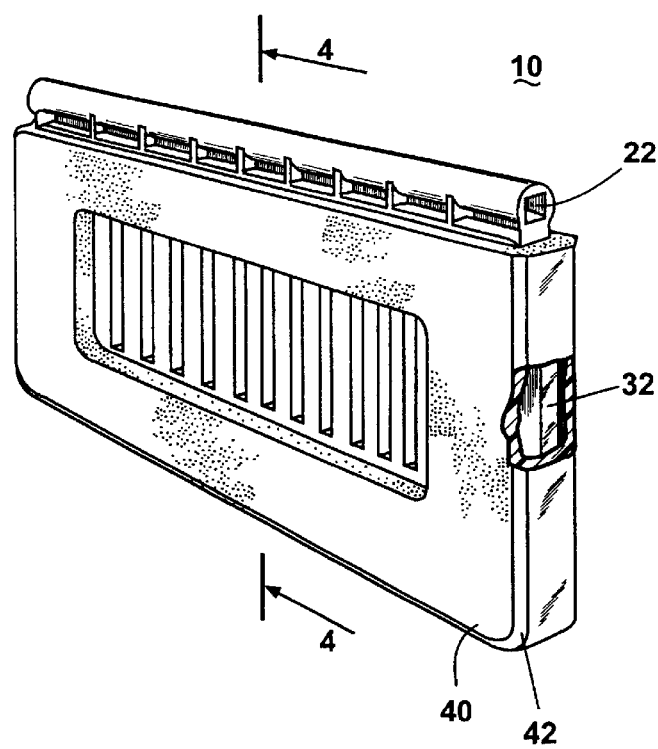
FIG. 3 is an alternative embodiment of a damper door with an integral seal according to the invention.
Figure 4:
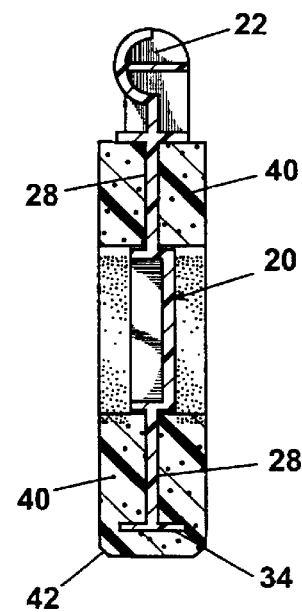
FIG. 4 is a sectional view taken along line 4—4 of FIG. 3.

In the first embodiment, as shown in FIGS. 1 and 2, the seal material 30 is formed about the periphery of a broad face 28. A broad face on the surface opposite face 28 can similarly receive the seal material 30 about its periphery. In an alternative embodiment, as shown in FIGS. 3 and 4, a seal material 40 is formed about lateral side edges 32 and a bottom side edge 34, whereby a seal can be effected between the peripheral edges of the damper 10 and the air passageway in which it is mounted. For this latter embodiment, the seal material 40 preferably includes a tapered outer surface 42, whereby rotation of the damper 10 from an open to a close position is not inhibited by the seal material 40 as it moves into the closed position.

For either embodiment, the material forming the seal material 30, 40 is preferably integrally molded to the carrier plate 20. The carrier plate 20 can be molded from a polyethylene resin, a glass reinforced Nylon resin or a glass filled polyester resin. A preferred material for the carrier plate 20 is a black, heat stabilized, 33% glass-reinforced Nylon 66 having a heat deflection temperature at 1.8 MPa of 240° C. and a melting point of 262° C. DuPont® markets such a material as Nylind 51 HSL BK 001. However, other similar materials may be used depending upon the desired physical characteristics and include glass filled polyester materials. In any case, the melting or softening point of the carrier plate 20 is above the activation temperature range of the sealing material. The sealing material is adhered to the carrier plate 20 during the process of heating the sealing material into the activation temperature range.

Other similar materials may be used depending on the desired physical characteristics. With any material, the melting or softening point of the carrier plate 20 is above the activation temperature range of the material forming the seal material 30, 40 which will be discussed next.

The sealing material 30 is preferably injection moldable and can include any expandable sealer, such as ethylene vinyl acetate, ethylene propylene diene mononer, butyl rubber, styrene butadiene rubber, or any other ethylene copolymers and terpolymers. The heat expandable sealing material 30 can also include a tackifying resin, filler, blowing agent, curing agent, adhesion promoter, or corrosion inhibitor. Examples of the sealing material are found in U.S. Pat. No. 5,266,133 and U.S. Pat. No. 5,212,208. Preferably, the activation temperature range of the sealing material is lower than 200° C., desirably below 150° C.

The preferred method for manufacturing the damper 10 is by injection molding the carrier plate 20 and then injection molding an expandable sealing material onto the carrier plate 20, either about the periphery of the face 28 according to the first embodiment or about the side edges 32, 34 as shown in the second embodiment. The carrier plate 20 and sealing material is then heated under controlled conditions, such as within the mold, to form the seal 30, 40 of preselected dimensions, such as those shown for either embodiment. After expansion of the sealing material, the carrier plate 20 and seal material 30, 40 are cooled and removed from the mold.

A feature of the invention is the ability to control direction of expansion of the sealing material upon heating the material into the activation temperature range. Such control is preferably exercised by defining the expansion parameters within a mold as part of the molding process. Another feature of the invention is the peripheral adhesion of the sealing material to the carrier plate 20, which is preferably accomplished by a side-by-side injection molding process. Together, these features—the ability to control directionality of expansion and the ability to adhere the sealing material about the periphery of the support plate—reduce the amount of time, labor, and material required to provide an effective seal about the periphery of the carrier plate 20. Furthermore, the control of the direction of the expansion and the ability to adhere the sealing material to the periphery of the control plate 20 provides consistency in the process for manufacturing the integrally-formed sealing material 30, 40. The damper 10 with integral seal 30, 40 can be manufactured efficiently and simply through side-by-side injection molding. This process is explained fully in U.S. Pat. No. 4,444,711 to Shad, and U.S. Pat. No. 4,460,534 to Boehm, which are hereby incorporated by reference.

Generally, side-by-side injection molding includes sequentially injecting different raw materials into a mold in such a way that different materials can be injection molded into a single part directly from the injection-molding machine. In summary, the first material is injected into the mold, cooled, and then by means of sliding cores in the mold, robotics, or revolving platens, a second material can be injected directly onto the first material. This process for producing dampers 10 has a lower cost in that it saves assembly time and labor, produces one part as opposed to two in the molding process, has a lower tooling cost than producing separate parts that must be bonded together, and provides an improved bond between the two parts. The damper 10 can be produced such that the carrier plate 20 and the seal 30, 40 are adhesively bonded notwithstanding the fact that the carrier plate material and sealing material are of different grades, properties, and/or colors of plastic material.

For example, to form a damper 10 within an integrally molded seal 30, 40, adjacent spaces defined by mold cavities have a movable core plate, that, in one position, locks one portion of the cavity while a first material is injection molded therein from an adjacent portion of the cavity. After the first material cools to solid form but preferably while still warm, the core plate is moved so that the adjacent portion of the cavity previously closed is then open. The second material is injection molded into this portion and the second material flows into the open space to integrally bond to the first part where the first part is exposed through openings in the mold. For the damper 10 with integral seal 30, 40, preferably the support plate 20 is molded of the first material, allowed to sufficiently cool, and then the sealing material, as the second material, is injection molded into the open space adjacent the carrier plate 20 and allowed to flow therein to integrally bond to the carrier plate 20 within the confines of the mold.

Preferably, before the carrier plate 20 reaches room temperature, the sealing material is injected into the mold to fill the mold space as well as any cavities or textured surfaces provided on the support plate 20. After the sealing material and the support plate 20 are molded together, the composite of the carrier plate 20 and the sealing material are transferred to a seal-forming mold and heated to within the activation temperature of the sealing material. Once the activation temperature range of the sealing material is reached, the material begins to expand in all directions to fill a space defined by the seal-forming mold. The seal-forming mold restricts the expansion of the seal forming material and defines the shape of the expanded seal 30, 40.

Because the composite carrier plate 20 and seal 30, 40 includes the sealing material integrally molded to the carrier plate, it is only necessary to provide enough sealing material to extend between the edges of the carrier plate and the walls of the mold defining the dimensions of the expanded seal 30, 40. This reduction in materials has a great advantage over prior damper plates, which typically used rolls or sheets of the sealing material that were then cut in the shape necessary to define the seal about the peripheral edge of the carrier plate 20. By integrally molding the expanded sealing material, and then expanding the sealing material to form a seal, a waste of material and time is no longer necessary.

In a manner similar to that described above, a damper with an integral seal composed of more than two different plastic materials can be obtained as will be readily apparent to those skilled in the art, keeping in mind that between each two successively adjacent spaces for different sections of the resulting composite damper, there must be a movable core registerable with an adjacent mold cavity portion for the flow of molten resin therein. Expansion of the sealing material to form an integral seal is accomplished in the manner described above.

While the invention has been described in connection with certain specific embodiments thereof, it is to be understood that this is by way of illustration and not of limitation, and the scope of the appended claims should be construed as broadly as the prior art will permit. Reasonable variation and modification are possible within the scope of the forgoing disclosure and drawings without departing from the spirit of the invention which is embodied in the appended claims.

What is claimed is:

1. A damper for selectively opening or closing an air passageway in a vehicle heating and cooling system, the damper comprising:
    a rigid carrier plate having opposed faces defined by a periphery with a shape generally corresponding to but smaller than the shape of a cross-section of the air passageway and formed of a material having a melting point above an activation temperature range;
    a heat-expandable sealing material mounted to at least one of the opposed faces of the rigid carrier plate and which is adapted to expand at a temperature in the activation temperature range;
    the sealing material, when activated, is adapted to expand outwardly from the rigid carrier plate to form an integral seal with the carrier plate.

2. A damper according to claim 1 wherein the sealing material is integrally molded to at least one of the opposed faces of the rigid carrier plate.

3. A damper according to claim 1 wherein the carrier plate includes a peripheral edge and the seal is formed about the peripheral edge.

4. A damper according to claim 1 wherein the sealing material has an activation temperature range lower than 150° C.

5. A damper according to claim 1 wherein the rigid carrier plate is relatively thin in cross-section compared to a peripheral dimension.

6. A damper for selectively opening or closing an air passageway of a heating and cooling system for a vehicle, the damper comprising:
    a rigid carrier plate having an outer periphery with a shape generally corresponding to but smaller than the shape of the cross section of the air passageway;
    a heat-expandable sealing material integrally molded to the outer periphery of the rigid carrier plate and having an activation temperature range in which the sealing material expands and which is less than the melting temperature of the rigid carrier plate;
    the sealing material, when activated, expands radially from the rigid carrier plate to define a seal.

7. A damper according to the claim 6 wherein the sealing material has an activation temperature range lower than 150° C.

8. A process for forming a damper with an integral seal for selectively opening or closing an air passageway of a heating and cooling system for a vehicle, the process comprising:
    forming a rigid carrier plate with a material that has a melting point above an activation temperature range and having an outer periphery with a shape generally corresponding to but smaller than the shape of a cross-section of the air passageway;
    integrally molding a heat-expandable sealing material to the outer periphery of the carrier plate, the heat-expandable sealing material being adapted to expand in the activation temperature range;
    heating the sealing material into the activation temperature range;
    expanding the sealing material outwardly from the carrier plate to fill a peripheral space between the sealing material and walls of a mold restricting expansion of the sealing material.

9. A process for forming a damper according to claim 8 wherein the forming step comprises injection molding.

10. A process for forming a damper according to claim 9 wherein the integrally molding steps for the carrier plate and the sealing material are performed sequentially in a two-step molding operation.

11. A process for forming a damper according to claim 9 wherein the heating step includes the heating the ceiling material to a temperature lower than 150° C.

12. A process for forming a damper according to claim 9 wherein the integrally molded step comprises injection molding.

13. A process for forming a damper for selectively opening or closing an air passageway in a heating and cooling system for a vehicle, the process comprising:
    forming a rigid carrier plate with a material that has a melting point above an activation temperature range and having opposes faces defined by a periphery with a shape generally corresponding to but smaller than the shape of the cross-section of the air passageway;
    mounting a heat-expandable sealing material to at least one of the opposed faces of the rigid carrier plate, the heat-expandable sealing material being adapted to expand in the activation temperature range;
    heating the sealing material,into the activation temperature range;
    expanding the sealing material radially from the rigid carrier plate to fill a peripheral space between the sealing material and walls of a mold.

14. A process for forming a damper according to claim 13 wherein the forming step comprises injection molding.

15. A process for forming a damper according to claim 14 wherein the integrally molding step for the rigid carrier plate and the integrally molding step for the sealing material are performed in two sequential injection molding steps.

16. A process for forming a damper according to claim 14 wherein the heating step includes heating the sealing material to a temperature lower than 150° C.

17. A process for forming a damper according to claim 14 wherein the forming step comprises injection molding.

18. A damper made in accordance with claim 8.

* * * * *

UNITED STATES PATENT AND TRADEMARK OFFICE
CERTIFICATE OF CORRECTION

PATENT NO. : 6,758,738 B1
DATED : July 6, 2004
INVENTOR(S) : Frederick P. Keller It is certified that error appears in the above-identified patent and that said Letters Patent is hereby corrected as shown below:

<u>Title page</u>
Item [*] Notice, should read:
-- Subject to any disclaimer, the term of this
   patent is extended or adjusted under 35
   U.S.C. 154(b) by 57 days. --.

Signed and Sealed this

Thirteenth Day of September, 2005

JON W. DUDAS
*Director of the United States Patent and Trademark Office*